United States Patent
Kanljung et al.

(10) Patent No.: US 6,438,108 B1
(45) Date of Patent: Aug. 20, 2002

(54) SYSTEM FOR IMPROVED TRANSMISSION OF ACKNOWLEDGEMENTS WITHIN A PACKET DATA NETWORK

(75) Inventors: Christofer Kanljung; Jan Kullander; Anders Svensson, all of Goteburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/266,654

(22) Filed: Mar. 11, 1999

(51) Int. Cl.[7] .............................. G06F 11/00; H04J 3/06
(52) U.S. Cl. ...................... 370/249; 370/412; 370/521; 714/746; 714/748
(58) Field of Search ................................ 370/229, 232, 370/235, 249, 389, 392, 412, 428, 429, 521, 522; 714/723, 746, 748, 749, 754

(56) References Cited

U.S. PATENT DOCUMENTS

5,179,555 A * 1/1993 Videlock et al. ............ 370/402
5,521,940 A * 5/1996 Lane et al. .................. 370/474
5,701,302 A * 12/1997 Geiger ........................ 370/521

FOREIGN PATENT DOCUMENTS

EP    0 836 300 A2 * 4/1998
EP          102861       11/1999

OTHER PUBLICATIONS

L. Kalampoukas et al., "Two–Way TCP Traffic over Rate Controlled Channels: Effects and Analysis", IEEE/ACM Transactions on Networking, vol. 6, No. 6, IEEE Inc., New York, U.S., Dec. 1998, pp. 729–743, XP000799239.

H. Balakrishnan et al., "A Comparison of Mechanisms for Improving TCP Performance Over Wireless Links", IEEE/ACM Transactions on Networking, vol. 5, No. 6, IEEE Inc., New York, U.S., Dec. 1997, pp. 756–769, XP000734405.

V. Jacobson, "Congestion Avoidance and Control", Computer Communication Review, U.S., Association for Computing Machinery, New York, U.S., vol. 25, No. 1, pp. 158–173, XP000512249.

M. Degermark et al., "Low–Loss TCP/IP Header Compression for Wireless Networks", Wireless Networks, Baltzer Science Publishers, vol. 3, No. 5, pp. 375–387, XP000728935.

* cited by examiner

Primary Examiner—Alpus H. Hsu
Assistant Examiner—Afsar M. Qureshi
(74) Attorney, Agent, or Firm—Jenkens & Gilchrist, P.C.

(57) ABSTRACT

A method and system for transmitting acknowledgments from an acknowledgment queue in a receiving system to a receiving system in response to receipt of a data packet from the receiving system is disclosed. An acknowledgment compressor co-located with an acknowledgment queue of the receiving system compresses a plurality of acknowledgments within the acknowledgment queue into a single acknowledgment packet. The single acknowledgment packet is transmitted from the receiving system to the sending system over a packet data network wherein it is intercepted at some point by an acknowledgment decompressor prior to receipt by the sending system. The acknowledgment decompressor regenerates the plurality of acknowledgments from the single acknowledgment packet and transmits the decompressed plurality of acknowledgments to the sending system.

19 Claims, 3 Drawing Sheets

SYSTEM FOR IMPROVED TRANSMISSION OF ACKNOWLEDGEMENTS WITHIN A PACKET DATA NETWORK

BACKGROUND OF THE INVENTION

1. Technical Field of the Invention

The present invention relates to packet data acknowledgment transmissions, and more particularly, to improved transmission of acknowledgments of received data packets in a packet data network having asymmetric access links.

2. Description of Related Art

Many applications used today over integrated networks, such as the Internet, are asymmetric in the sense that the applications receive more data then they transmit. Thus, it makes sense to utilize asymmetric links for these applications to more efficiently utilize system resources. In an asymmetric access link, the link from the sending system to the receiving system includes different properties than the link from the receiving system to the sending system. Most commonly, the link between the sending and receiving system will have a higher bandwidth than the link between the receiving and the sending system. The concept of asymmetric access links may be extended to asymmetric networks wherein a forward path from a sending host to a receiving host includes different properties than the return path from the receiving host to the sending host.

Applications require reliable delivery of data between the sending and receiving systems. In order to accomplish this, some type of reliable transport protocol must be used to move data over an integrated network like the Internet. The most commonly used transport protocol for packet data transfer on the Internet today is TCP (transfer control protocol). When a data packet is transferred from a sending system to a receiving system using the TCP protocol, an acknowledgment is provided back from the receiving system to the sending system to confirm receipt of the transmitted data packet and insure reliable data transfer. The transmitted data packet is sent over a forward path having a first bandwidth from the sending system to the receiving system, and the acknowledgments are transmitted on a reverse path having a lower bandwidth. A problem arises when the forward path having the larger bandwidth is transmitting a large amount of data to the receiving system. The smaller bandwidth reverse path may become involved in an overflow condition which limits overall system throughput.

TCP uses acknowledgments from the receiving system to inform the sending system that the data packets have arrived at their destination. According to the TCP protocol, the receiving system may only have a certain amount of outstanding, unacknowledged packets at any time. This amount is referred to as the "sender window (size)" or as the "congestion window". Once the maximum sender window size is reached, no more packets may be transmitted.

In an asymmetric system where the bandwidth of the forward path is greater than the bandwidth of the reverse path, a risk exists that the receiver may generate acknowledgments faster than it is possible to transmit them on the reverse path. The factors affecting whether acknowledgments will become delayed on the reverse path include the ratio between the bandwidth of the forward path and the reverse path, the size of the acknowledgments being transmitted and the frequency with which the acknowledgments are being transmitted.

The frequency of the acknowledgments is dependent upon the frequency and size of data packets transmitted from the receiving system. Smaller packets from the receiving system mean that more data packets are received per unit time, and thus, more acknowledgments must be transmitted in response to their receipt. Other factors affecting whether or not a backlog of acknowledgments arise include how often and under what circumstances acknowledgments must be transmitted. According to some acknowledgment systems, packets are only generated for every received segment or every other received segment. The number of required acknowledgments affects the potential backlog.

When acknowledgments are generated faster than they may be transmitted, the generated acknowledgments must be queued at the output device until they can be transmitted. Depending upon the maximum size of the queue at the output device, one of two things may happen. If the maximum queue size is small compared to the sender window size of the connection, acknowledgments may have to be dropped when the queue becomes full. If the maximum queue size is large compared to the sender window size of the forward link, the queue will grow until the rate of data flow of received data decreases such that the acknowledgment queue may be emptied to a level ensuring the receipt of sufficient acknowledgments at the sending system to continue data transfer from sending system.

If the maximum queue size of the reverse path is too small and acknowledgments are dropped, the sending system congestion window size does not evolve as quickly as it would have if every acknowledgment were delivered to the sending system. This is because the congestion window of the sending system increases by a certain amount each time an acknowledgment arrives, no matter how many segments of acknowledgments are actually received. The loss of acknowledgments also causes bursty sender behavior because the acknowledgments actually received by the receiving system indicate a larger range of segments than if segments were received sequentially. This enables the sending system to transmit a larger number of segments in the same burst which may lead to congestion on the forward path and to retransmit the lost packets.

If the maximum size of the reverse path is to large, the acknowledgment must wait for a long period of time within the queue before it is transmitted. This increases the RTT (What is RTT?) for an associated data segment. A long RTT leads to slow growth of the sender congestion window since the size of the congestion window increases for each acknowledgment received. This causes a corresponding slow down in throughput on the forward path.

Several solutions have been suggested for improving the throughput of acknowledgments within an asymmetric access network. One technique utilizes header compression of each TCP segment carrying an acknowledgment. This technique reduces the size of a single acknowledgment from 40 bits to about 5 bits. Link layer compression or PPT data compression are other techniques used to compress data on a single physical link. These compression schemes operate at the link layer after the performance of any header compression. Each of these solutions will not solve the problem on the reverse link if the degree of asymmetry is high.

If acknowledgments are cumulative (i.e., acknowledge all segments up to a latest segment received), the problem may be solved by dropping the entire queue when an acknowledgment cannot be inserted into the queue and placing the acknowledgment at the head of the now empty queue. Unfortunately, this method causes bursty behavior at the sending system since multiple packets will then be transmitted upon the receipt of a single acknowledgment. This causes transient congestion at intermediate routers on the forward path. The reason for the bursty behavior arises from the fact that the acknowledgment will acknowledge a great number of segments which in turn will open the receiving system window to enable transmission of a burst including a large number of packets rather than just a single packet for each arriving acknowledgment. This causes a slowdown in the increase of the congestion window due to the fact that the congestion window increase is based on the number of returned acknowledgments and not the number of segments that the acknowledgment acknowledges.

A solution to the problem of bursty sending system behavior involves breaking down large bursts into smaller bursts that are scheduled to be transmitted over selected time intervals. The problem of slow congestion window growth has been controlled by modifying a sending system to take into account the number of segments acknowledged by an acknowledgment when adjusting the congestion window. However, both of these solutions must be deployed in every host that acts as a sending system within an asymmetric system. This greatly increases the hardware and time requirements necessary to implement such a system.

SUMMARY OF THE INVENTION

The present invention overcomes the foregoing and other problems with a system and method for transmitting acknowledgments from an acknowledgment queue of a receiving system to a sending system in response to receipt of a data packet from the sending system over a packet data network. An acknowledgment compressor co-located with the acknowledgment queue of the receiving system compresses a plurality of acknowledgments contained within the queue into a single acknowledgment packet for transmission to the receiving system over the packet data network. The single acknowledgment packet includes the first acknowledgment of the plurality of acknowledgments, the number of total acknowledgments contained within the plurality of acknowledgments, a difference between each sequence identifier for the acknowledgments and the time lapse between insertion of the first acknowledgment and the last acknowledgment within the acknowledgment queue.

The single acknowledgment packet including this information is transmitted over the packet data network to the sending system. The sent packet is intercepted by a acknowledgment decompressor prior to receipt by the sending system. The acknowledgment decompressor regenerates the plurality of acknowledgments from the single acknowledgment packet. The acknowledgments are regenerated in their original order from the acknowledgment queue and are transmitted onward to the sending system at a preselected interval that may be based on the original separation between acknowledgments within the acknowledgment queue.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 1:
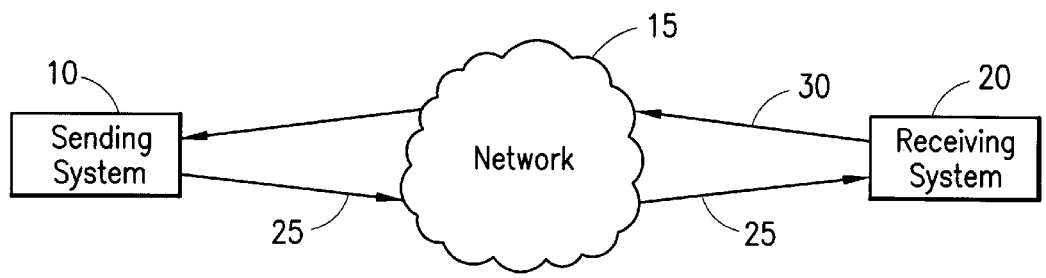
FIG. 1 illustrates an asymmetric network in which the present invention operates.

Referring now to the Drawings, and more particularly to FIG. 1, there is illustrated the system in which the present invention operates. A sending system 10 transmits packet data over a network 15 to a receiving system 20. The network 15 comprises a packet-switched network, such as the Internet, that utilizes a sliding window transport protocol (for example, TCP) using return acknowledgments as an indication that a packet has left the network in order to conserve the amount of outstanding packets within the network. The bandwidth of the forward path 25 will be greater than the bandwidth of the reverse path 30 such that the system comprises an asymmetric network. Transmissions from the sending system 10 to the receiving system 20 are carried out over a forward path 25, while acknowledgment transmissions of received data packets from the receiving system 10 are transmitted on a reverse path 30.

Figure 2:
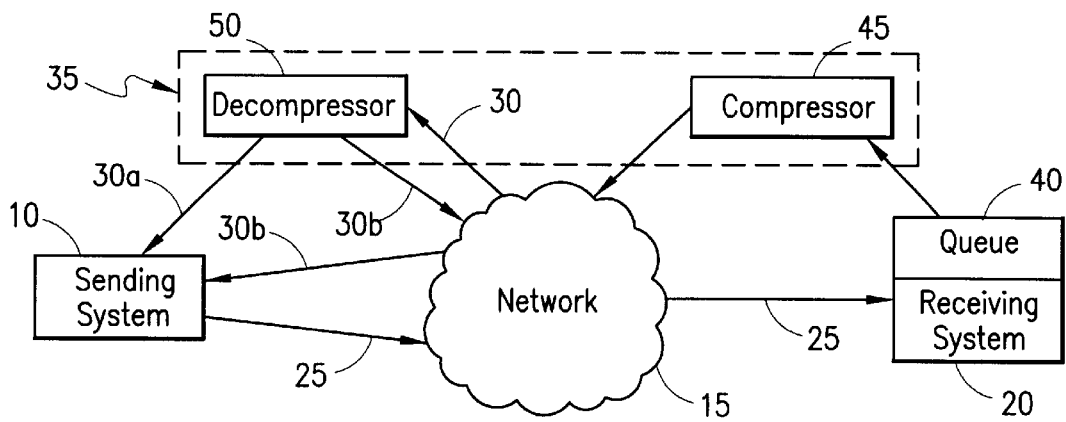
FIG. 2 illustrates an asymmetric network including the acknowledgment compression/decompression system of the present invention.

Referring now to FIG. 2, there is illustrated a packet data transmission system including the sending system 10, network 15, and receiving system 20, previously discussed with respect to FIG. 1. Also included with this packet data transmission system is the acknowledgment compression/decompression system 35 of the present invention. Packets of data are transmitted from the sending system 10 to the receiving system 20 through the network 15 using the forward path 25. In response to receipt of a packet of data, the receiving system 20 generates an acknowledgment indicating receipt of the packet for transmission back to the sending system 10 to notify the sending system that a particular packet of data has been received. The generated acknowledgment is placed in the output queue 40 of the receiving system 15 until it can be transmitted to the sending system 10. A time stamp containing the current time is associated with the queued acknowledgment.

When the output queue 40 reaches a configureable maximum size or other selected volume, a range of equal distance acknowledgments are compressed by an acknowledgment compressor 45 into a single acknowledgment packet. This will be more fully discussed with respect to FIG. 3. Acknowledgments are separated by equal distances such that the difference between the sequence numbers (time stamps) of two adjacent acknowledgments are the same for each acknowledgment within the compressed range.

The single acknowledgment packet is forwarded through the network 15 through the reverse path 30 to an acknowledgment decompressor 50. When the compressed acknowledgment packet is received by the acknowledgment decompressor 50, the packet is decompressed such that each of the originally compressed acknowledgments is recreated. The recreated acknowledgments are forwarded in a sequential, selectively-spaced order back to the sending system 10.

The acknowledgment decompressor 50 is located at some point in the network 15 on the reverse path 30 between the compressor 45 and sending system 10. In the preferred embodiment, the acknowledgment decompressor 50 will not be co-located with the sending system 10 such that decompressed acknowledgment will pass along the reverse path as indicated by 30b through the packet network 15 in order to reach the receiver system 10. However, the present invention would function equally well if the acknowledgment decompressor 50 was co-located with the receiver system 10 such that the decompressed acknowledgments were directly transmitted to the receiver system via the path indicated by 30a.

Figure 3:
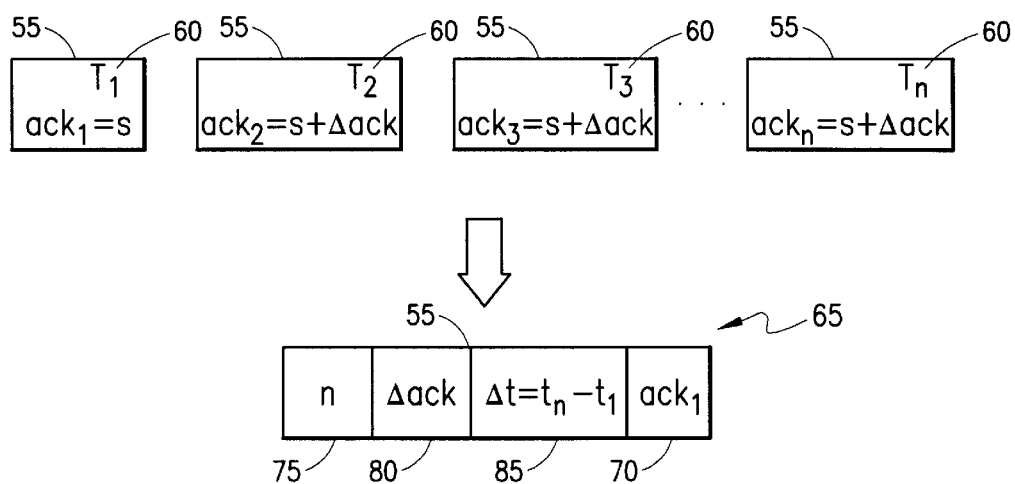
FIG. 3 illustrates the compression of a number of acknowledgments into a single acknowledgment packet.

Referring now to FIG. 3, there is illustrated the manner for compression of acknowledgments according to the present invention. The data within the queue 40 (FIG. 2) consist of a plurality of acknowledgments 55. Each acknowledgment 55 include a time stamp 60 and is separated from adjacent acknowledgments by a $\Delta ACK$. The illustration in FIG. 3 shows a sequence of acknowledgments starting at a sequence number s separated by $\Delta ACK$. Thus, acknowledgment number 1 is at sequence number s, acknowledgment number 2 is at s+$\Delta ACK$, acknowledgment number 3 is at s+2$\Delta ACK$, etc. The sequence of acknowledgments 55 are compressed into a single packet 65.

The packet 65 containing the compressed acknowledgments 55 must contain specific information needed to recreate the original sequence of acknowledgments at the decompressor 50. The packet 65 must include the first acknowledgment 70 contained within the queue, the number 75 of acknowledgments in the sequence of acknowledgments, and the value for $\Delta ACK$ 80 (i.e., the distance between compressed acknowledgments). The value of $\Delta ACK$ may be 0 which enables the compression of duplicate acknowledgments. The single acknowledgment packet also includes the time that has elapsed between the insertion of the first and last acknowledgments in the queue 40 (FIG. 2) prior to compression $\Delta t$ 85. After compression, the packet 65 is reinserted into the queue 40 for transmission on the reverse path 30. Since the queue 40 is now empty, the packet 65 is transmitted as soon as the packet currently being transmitted by the receiving system 20 has been transmitted.

Figure 4:
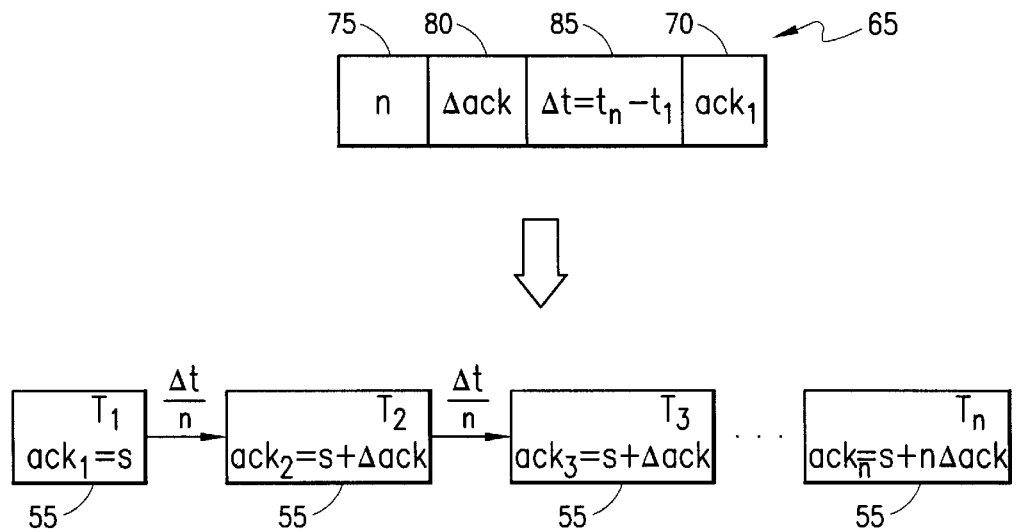
FIG. 4 illustrates the decompression of a single acknowledgment packet into its component acknowledgments.
Figure 5:
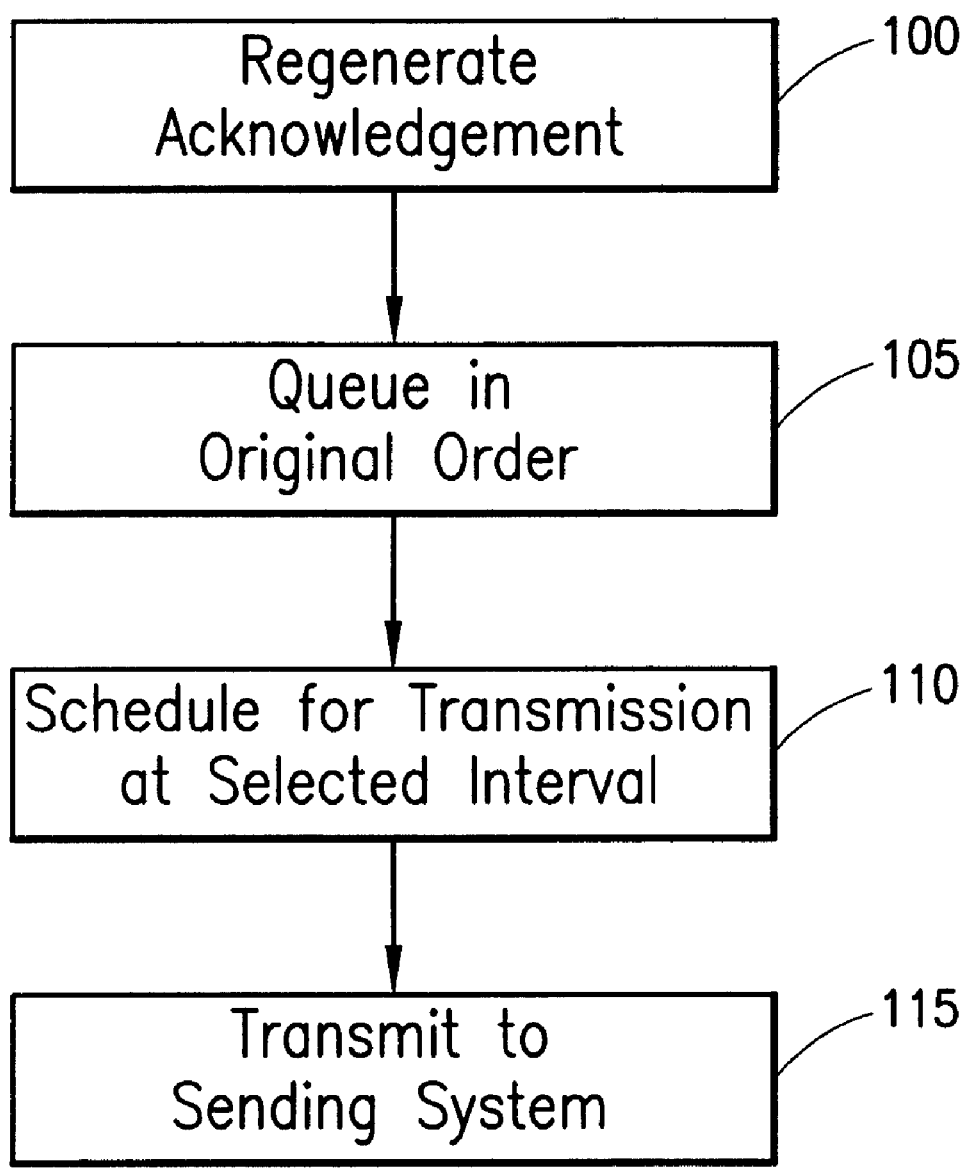
FIG. 5 is a flow diagram more fully illustrating the method for decompression of an acknowledgment burst.

Referring now to FIGS. 4 and 5, there is illustrated the decompression of a packet 65 back into individual acknowledgments 55, and a flow chart illustrating the steps of this process. The number of acknowledgments 55 in the packet 65 and the value for $\Delta ACK$ 80 are used to regenerate the original uncompressed acknowledgments at step 100. The regenerated acknowledgments 55 are queued at step 105 in their original order for transmission to the sending system 10. Each of the regenerated acknowledgments 55 are scheduled for transmission to the receiver system 10 at an interval of $\Delta t/n$ (i.e., their original interval prior to compression) at step 110. The acknowledgments 55 are transmitted at step 115 to the sending system 10. The reconstruction of the original acknowledgments 55 provide a correct growth of the congestion window at the sending system 10. By scheduling the retransmission of the acknowledgments 55 from the decompressor 50 at regular intervals, bursty behavior is prevented at the sending system 10 since all decompressed acknowledgments are not provided to the system at one point in time.

Thus, by compressing acknowledgments 55 for transmission on the reverse path 30 of an asymmetric transmission network and decompressing the compressed packets at a point prior to receipt at a sending system 10 and retransmitting the decompressed packets in their original sequence, the present invention provides faster growth of the sender congestion window in the slow start and congestion avoidance phases. The sending system has less bursty behavior and thereby reducing the risk of transient congestion within the intermediate routers between the sending system 10 and the receiving system 15. Furthermore, by reducing the risk of congestion, the risk of congestion related losses causing slow starts and reduced throughput are minimized. Furthermore, the faster transmission of acknowledgments provide for faster detection and retransmission.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A system for transmitting acknowledgments from an acknowledgment queue of a receiving system to a sending system in response to receipt of a data packet from the sending system over a packet data network, comprising:
   an acknowledgment compressor connected to the acknowledgment queue at the receiving system for compressing a plurality of acknowledgments queued within the acknowledgment queue into a single acknowledgment packet for transmission to the sending system over the packet data network; and
   an acknowledgment decompressor located at some point in the packet data network between the sending system and the acknowledgment compressor for regenerating the plurality of acknowledgments from the signal acknowledgment packet.

2. The system of claim 1, wherein the acknowledgment decompressor further transmits each of the regenerated plurality of acknowledgments to the sending system at a selected time interval.

3. The system of claim 1, wherein the selected time interval comprises an original time interval between the acknowledgments prior to compression into the single acknowledgment packet.

4. The system of claim 1, wherein the single acknowledgment packet includes at least one of a first acknowledgment of the plurality of acknowledgments, a number of acknowledgments included in the plurality of acknowledgments, a difference between sequence identifiers identifying acknowledgments, and a time between insertion of a first of the plurality of acknowledgments in the acknowledgment queue and insertion of a last of the plurality of acknowledgments in the acknowledgment queue.

5. The system of claim 4, wherein the acknowledgment decompressor regenerates the plurality of acknowledgments using the first acknowledgment, the number of acknowledgments and the difference between sequence identifiers.

6. The system of claim 1, wherein the acknowledgment compressor further reinserts the single acknowledgment packet back into the acknowledgment queue for transmission.

7. The system of claim 1, wherein the acknowledgment compressor activates in response to a full condition of the acknowledgment queue.

8. The system of claim 1, wherein the acknowledgment decompressor regenerates the acknowledgments in their original order.

9. A method for transmitting acknowledgments from an acknowledgments queue of a receiving system to a sending system in response to receipt of a data packet from the sending system over a packet data network, comprising the steps of:
   compressing a plurality of acknowledgments within the acknowledgment queue into a single acknowledgment packet;
   transmitting the single acknowledgment packet toward the sending system;
   decompressing the single acknowledgment packet into the original plurality of acknowledgments prior to reception at the receiving system; and transmitting the decompressed plurality of acknowledgments to the receiving system.

10. The method of claim 9 further including the steps of:

placing the single acknowledgment packet back into the acknowledgment queue prior to transmission toward the sending system.

11. The method of claim 9, wherein the step of compressing further comprises the steps of:

placing at least one of the following within the single acknowledgment packet: a number of the plurality of acknowledgments, a difference between sequence identifiers identifying the plurality of acknowledgments, a first acknowledgment of the plurality of acknowledgments, and a time between insertion of a first and insertion of a last of the plurality of acknowledgments in the acknowledgment queue.

12. The method of claim 9 further including the step of:

inserting the single acknowledgment packet back into the acknowledgment queue for transmission.

13. The method of claim 9, wherein the step of decompressing further includes the step of:

ordering the decompressed plurality of acknowledgments in their original order.

14. The method of claim 9, wherein the step of transmitting the decompressed plurality of transmitters further includes the step of:

transmitting the acknowledgments at selected time intervals.

15. A system for transmitting acknowledgments from an acknowledgment queue of a receiving system to a sending system in response to receipt of a data packet from the sending system over a packet data network, comprising:

an acknowledgment compressor responsive to a full condition of the acknowledgment queue for compressing a plurality of acknowledgments queued within the acknowledgment queue into a single acknowledgment packet for transmission to the sending system over the packet data network; and an acknowledgment decompressor located at some point in the packet data network between the sending system and the acknowledgment compressor for regenerating the plurality of acknowledgment packets in original order from the single acknowledgment packet and for transmitting the regenerated plurality of acknowledgments to the sending system at a selected time interval.

16. The system of claim 15, wherein the selected time interval comprises an original time interval between the acknowledgment packets prior to compression into the single acknowledgment packet.

17. The system of claim 15, wherein the single acknowledgment packet includes at least one of a first acknowledgment of the plurality of acknowledgments, a number of acknowledgments included in the plurality of acknowledgments, a difference between sequence identifiers identifying acknowledgments, and a time between insertion of a first of the plurality of acknowledgments in the acknowledgment queue and insertion of a last of the plurality of acknowledgments in the acknowledgment queue.

18. The system of claim 17, wherein the acknowledgment decompressor regenerates the plurality of acknowledgments using the first acknowledgment, the number of acknowledgments and the difference between sequence identifiers.

19. The system of claim 15, wherein the acknowledgment compressor further reinserts the single acknowledgment packet back into the acknowledgment queue for transmission.

* * * * *

UNITED STATES PATENT AND TRADEMARK OFFICE
CERTIFICATE OF CORRECTION

PATENT NO.    : 6,438,108 B1
DATED         : August 20, 2002
INVENTOR(S)   : Kanljung et al.

It is certified that error appears in the above-identified patent and that said Letters Patent is hereby corrected as shown below:

Title page, Item [54] and Column 1, lines 1-3,
Replace "SYSTEM FOR IMPROVED TRANSMISSION OF ACKNOWLEDGEMENTS WITHIN A PACKET DATA NETWORK" with
-- SYSTEM FOR IMPROVED TRANSMISSION OF ACKNOWLEDGMENTS WITHIN A PACKET DATA NETWORK --

Drawings,
Figure 3, (reference $T_3$) replace "$ack_3=s+\Delta ack$" with -- $ack_3=s+2\Delta ack$ --
Figure 3, (reference $T_n$) replace "$ack_n=s+\Delta ack$" with -- $ack_n=s+n\Delta ack$ --
Figure 4, (reference $T_3$) replace "$ack_3=s+\Delta ack$" with -- $ack_3=s+2\Delta ack$ --

Column 2,
Line 43, remove "(What is RTT?)"

Signed and Sealed this

Twenty-fourth Day of June, 2003

JAMES E. ROGAN
*Director of the United States Patent and Trademark Office*